Dec. 31, 1963  C. E. THOMPSON  3,116,169
FUEL CELL AND FUEL CELL ELECTRODES
Filed March 14, 1960

Charles E. Thompson Inventor
By Alvin B. Johnson
Patent Attorney

United States Patent Office 3,116,169
Patented Dec. 31, 1963

3,116,169
FUEL CELL AND FUEL CELL ELECTRODES
Charles E. Thompson, Fanwood, N.J., assignor to Esso Research and Engineering Company, a corporation of Delaware
Filed Mar. 14, 1960, Ser. No. 14,868
26 Claims. (Cl. 136—86)

This invention relates to improvements in systems wherein combustible fuels are oxidized and a substantial portion of the resulting energy of oxidation is converted directly, i.e., by electrochemical reaction, to electrical energy.

In particular this invention relates to the discovery of a novel and highly efficient electrode for use in the oxidation of a fuel gas or liquid in a fuel cell, to the operation of fuel cells wherein such electrodes are employed, and to methods for preparing such fuel cell electrodes. This application is a continuation-in-part of application Serial No. 827,984, now abandoned, and application Serial No. 832,419, now abandoned, both filed May 7, 1959.

It long has been known that electric current can be produced directly from combustible materials by electrochemical reaction. In recent years, however, research activity in this field has been greatly accelerated. The vehicle for carrying out such reactions has become known in the art as the "fuel cell."

The true fuel cell differs from other primary batteries in that fuel is continuously or intermittently supplied to the cell and its electrodes are not consumed.

Attention has been drawn to the fuel cell largely because of the potentially higher efficiency obtainable in the conversion of natural fuels to electrical energy by this means as compared to conventional means of power production. The theoretical efficiency of energy conversion in the fuel cell approaches 100% and operating efficiencies approaching 75% have been claimed in the literature.

The requisites of an operating fuel cell include two or more electrodes, an electrolyte, an oxidizing gas and a supply of combustible fuel.

In fuel cell operations an electrode through which a source of oxygen is introduced to the cell is commonly known as an "oxygen electrode." An electrode through which a combustible fuel is introduced to the cell or which accepts electrons from fuel admitted directly to the electrolyte is commonly known as a "fuel electrode." When employed herein, the term "cathode" shall be understood to refer to the "oxygen electrode," and the term "anode" shall be understood to refer to the "fuel electrode."

The maximum difference in potential between the electrodes of an individual cell is limited by the free energy change occurring in the reaction taking place in the cell. Most practical applications for the fuel cell therefore envision the use of a number of individually small cells connected in series and/or parallel. The desideratum therefore is a cell having as high a capacity as possible per unit volume.

An individual fuel cell is ordinarily made up of a cell container, two conducting electrodes consisting of or impregnated with a material having a catalytic effect upon the desired electrochemical reactions, insulators, connecting means associated with each electrode for establishing electrical contact with an external circuit, means for introducing an oxidizing gas to a cathode, means for introducing a fuel to an anode, and an electrolyte.

The cell container may be constructed of any solid material having a melting point above the temperature of operation which will not be corroded by the electrolyte employed and which has sufficient strength to withstand the desired pressure of operation. The operating pressures may vary from about 1 to 50 atmospheres. The cell container may be an open tank or a closed vessel. Suitable container materials include glass, certain non-corrosive stainless steels, nickel plated ferrous metals, ceramic compositions, high molecular weight hydrocarbon polymers such as polyethylene, polypropylene, and polystyrene, chlorinated rubbers such as chlorinated butyl rubber, polyvinyl chlorides, polymeric fluorocarbons and phenol-formaldehyde polymers, etc.

It is necessary that the electrodes be insulated from the container wherever the cell container employed is itself a conductor. This insulation may be effected by conventional insulating materials such as glass, porcelain, one of the aforementioned polymers, etc.

The electrolyte must be electronically non-conductive but a medium in which ionic mobility can be achieved.

With a basic electrolyte oxygen is reacted with the aqueous solution of electrolyte to form negatively charged ions at the oxygen electrode, fuel is oxidized at the fuel electrode where carbon dioxide and/or water is formed, and free electrons are released upon a conducting surface of the fuel electrode. When current is drawn from the cell there is a net flow of electrons from the fuel electrode (anode) through the external circuit to the oxygen electrode (cathode).

The electrodes of this invention are suitable for use in any cell of this type employing an aqueous electrolyte and a liquid or gas fuel. Cells of this type will not ordinarily be operated above 600° F. or below room temperature, i.e. about 77° F.

Electrochemical reaction at the fuel electrode occurs where the catalyst, the electrolyte and the fuel are simultaneously exposed to each other. The rate of electrochemical reaction is vitally affected by the catalyst employed.

In the past various metals and certain oxides thereof have been tested for catalytic activity at the "fuel electrode." These have included such metals as copper, nickel, iron, lead and platinum. In some instances the electrodes have been formed from the catalytic material itself while in other applications a base of other material such as porous carbon has been impregnated with the catalytic material. Some catalysts fail for want of initial activity while others although exhibiting considerable activity at the outset quickly lose their usefulness. Of the latter type some undergo chemical change to a form that is soluble in certain electrolytes, some react with certain electrolytes upon contact and are consumed as in storage batteries, while with others a severe drop in potential between the electrodes ensues when current is drawn from the cell, thereby severely limiting the output of power from the cell.

It has now been discovered that cobalt molybdate is a highly superior material for accelerating reaction at the fuel electrode. Its activity can be maintained over long periods of sustained operation. When current is drawn from a cell some polarization, represented by a voltage drop, always occurs at each electrode thereby reducing the open circuit potential between the anode and cathode. This in turn limits the power output from the cell since this polarization ordinarily increases as the current drawn from the cell increases.

It has been found that when cobalt molybdate is employed at the fuel electrode, i.e., the anode, increased amounts of current can be withdrawn from the cell with very little polarization taking place. Thus by drawing increased amounts of current while maintaining the voltage loss at a minimum the usable power output from the cell is greatly enhanced.

It is to be understood, of course, that the power output of any cell is dependent upon effectiveness of both the anode and the cathode, the reaction at one being essentially independent of the other.

The value of a given fuel electrode therefore is determined by comparison with other fuel electrodes in a system employing a particular cathode, i.e., oxygen electrode. Even with a relatively ineffective cathode the limits of many fuel electrode catalysts can be determined. This becomes obvious when a relatively high polarization, i.e., voltage drop, occurs at the fuel electrode upon drawing a small amount of current from the cell. The superior fuel electrode catalyst will under comparable circumstances exhibit a much lower polarization. However, to fully test the degree of superiority exhibited by a particular fuel electrode catalyst an oxygen electrode must be present which will permit the drawing of increasing amounts of current until polarization rises at the fuel electrode to a point where the power output from the cell can no longer be increased, i.e., until the fuel electrode becomes the limiting element.

Cobalt molybdate has been compared with known anode catalysts against a common oxygen electrode and found to be highly superior for purposes of power output. This is especially true in relation to other catalysts which are relatively stable under the conditions of operation. Catalysts which are consumed or otherwise deteriorate in short periods of operation eliminate themselves from further consideration. For instance, molybdena is soluble in mineral acids and strong bases such as KOH. It therefore becomes removed from the critical point of reaction, i.e., the electrode, as it dissolves in the electrolyte. Elemental cobalt reacts with mineral acids to liberate $H_2$ and form the salt of the acid and is also removed from the electrode. With strong bases cobalt in its active catalytic form will react to form cobalt oxide which in turn forms a cobalt compound which is soluble with excess base.

Cobalt molybdate is chemically inert to both basic and acidic electrolytes under the conditions of reaction employed in a fuel cell using an aqueous electrolyte. It has proven to be a very stable catalyst after extended periods of use and is not easily poisoned as are many catalysts heretofore employed.

Fuel electrodes employing cobalt molybdate may be used in conjuction with any operable oxygen electrode including those heretofore employed in the art. These are well known to those skilled in the art and include a wide variety of structures wherein the catalytic component is a noble metal, e.g., Au, Ag, Pt, Pd, Rh or Ir, an oxide of a transition metal, e.g., MnO, CoO or NiO, or mixtures of the same. The term "oxide" is used in a strict sense and is not intended to include metal salts which may be veiwed as a combination of oxides, e.g., potassium chromate, cobalt molybdate, etc.

While cobalt molybdate is a very effective material for accelerating electrochemical reaction at the anode of a fuel cell, i.e., oxidation of a combustible fuel resulting in the release of free electrons to a conducting surface, it is essentially a non-conductor. A structure prepared exclusively of this compound cannot be effectively employed as an electrode which by definition is an appliance by which an electric current passes in and out of a cell, apparatus or body.

Therefore, an electrode utilizing this material to accelerate electrochemical reaction in proximity to its surface must comprise a good electron conductor and cobalt molybdate in chemical and/or physical association with such conductor, i.e., in cooperative relationship so that electrons released by such reaction are released to the surface of the conductor.

High surface areas per unit of volume are achieved by employing a foraminated or porous body. A foraminous structure comprising an electron conductor and a catalytic material therefor provides an ideal structure for a fuel cell electrode. Cobalt molybdate is particularly effective when employed with carbon. Carbon, although possessing properties of conductivity, does not of itself provide sufficient catalytic activity to be used alone for this purpose. A foraminous structure comprising a carbonaceous material and cobalt molybdate therefore provides a highly effective anode or fuel electrode. While this highly effective combination is used herein to illustrate the advantages derived from the use of cobalt molybdate in such systems, other conductors may be used which are compatible with cobalt molybdate and which do not destroy or materially effect the capacity of this material to accelerate electrochemical reactions of combustible fuels.

It is also within the purview of this invention to increase the structural strength of carbon structures employed in cooperation with cobalt molybdate by including other materials in the preparation of such structures. The use of additional materials, however, is limited to materials which do not materially affect the catalytic propensities of cobalt molybdate and to an employment thereof which does not appreciably reduce the conductivity of the carbon or interrupt continuous conductivity throughout the electrode, i.e., destroy the continuous skeletal form of the carbon mass.

Cobalt molybdate may be used in cells employing aqueous electrolytes of strong bases such as KOH, NaOH, LiOH, etc. It may be employed in cells wherein an acid electrolyte such as aqueous solutions of $H_2SO_4$, $H_3PO_4$, HCl, $HNO_3$, peracetic acid or other strong acids are used. It is, of course, also suitable for use in aqueous carbonate electrolytes, e.g.

$K_2CO_3$—$KHCO_3$, $Na_2CO_3$—$NaHCO_3$

Cobalt molybdate remains stable in such systems under all conditions of temperature and pressure feasible for operating a fuel cell with an aqueous electrolyte, e.g., room temperature to 500° F. or more at 1 to 50 atmospheres.

Fuel electrodes employing a carbon base and a cobalt molybdate catalyst may take many forms, including those heretofore employed with other electrodes having a carbon base. This will include the various types of diffusion electrodes wherein a fuel gas passes through an electrode wall of porous carbon to contact the electrolyte and other types of contact electrodes which may or may not have a porous structure such as those employed in a cell wherein the fuel is admitted into the electrolyte before contacting the fuel electrode. This catalyst may be employed in cells operating on either hydrogen or carbonaceous fuels. It is particularly valuable with carbonaceous fuels, e.g., hydrocarbons, oxygenated hydrocarbons, carbon monoxide, etc., which are more difficult to oxidize than hydrogen.

Although this catalyst is suitable for use with any carbon electrode, the efficiency of any fuel cell employing carbon electrodes is enhanced if electrodes of proper pore size and surface area are employed.

As aforementioned, the area of effective electrochemical reaction at the fuel electrode is limited to that area which is simultaneously exposed to the catalyst, the electrolyte and the fuel. Therefore, in order for a cell to approach theoretical efficiency, it is of vital importance to maximize this area within a given unit of volume.

When a gaseous fuel and a liquid electrolyte are used in the fuel cell, the effective area of electrochemical reaction becomes an area of three phase contact. The gas-liquid distribution within a porous electrode affecting this area is dependent upon total surface area which is controlled by total porosity, pore diameter of the larger pores and the distribution of different size pores.

The use of porous carbon electrodes was suggested at an early date as a means of providing an area of increased contact between the requisite parts. Carbon electrodes can be used in many different systems employing a wide variety of electrolytes.

A suitable carbon electrode must have sufficient structural strength to withstand the conditions under which it is to be employed over long periods of time.

The total surface area of a carbon electrode should be as large as possible while maintaining structural strength and a proper distribution of pore sizes. In a fuel cell wherein the fuel is introduced as a gas, an effective diffusion electrode must have pores of suitable diameter to perform two distinct functions. A first group of larger pores serves as conduits for the fuel gas to enter the area of electrochemical activity. A second and smaller group of pores is necessary to serve as conduits for the liquid electrolyte to reach the interior surfaces of the electrode and thereby contact the gas filled pores in as many places as possible in the presence of the catalyst and the conducting electrode. If in the first group the pores are of insufficient diameter, extreme gas pressures will be required to overcome the force of capillary action and liquid electrolyte will flood the electrode decreasing the electrochemical activity or stopping the reaction altogether. On the other hand, if this first group of pores varies widely in size and contains pores of excessive diameter, fuel gas will escape as bubbles into the electrolyte causing a gas pressure drop in lesser gas filled pores, resulting in electrolyte flooding these pores and an undesirable gas-liquid distribution within the electrode.

It is desirable to employ carbon having a maximum pore diameter which does not exceed about $4 \times 10^5$ A. and wherein 30 to 70% of the pore volume within a unit volume of carbon is formed by pores having a diameter in the range of about $0.2 \times 10^4$ A. to $2 \times 10^5$ A.

It should be understood, however, that cobalt molybdate may be advantageously employed with or as a component of any operable carbon electrode heretofore known in the art and will improve the effectiveness of such electrode within its own limitations. With those cells, hereinafter discussed, wherein liquid fuel entering the cell enters by means other than diffusion through a porous electrode the desideratum of porosity is not necessarily the same.

A highly superior fuel cell electrode can be prepared by oxidizing a high density carbon electrode and then treating the carbon base so as to form cobalt molybdate on the surface thereof.

The term "high density" is used herein to refer to a carbon mass having an apparent or bulk density of about 1.2 to 2.1 grams/cc.

The terms "apparent density" and "bulk density" as used herein refer to the weight of a cubic centimeter of porous material with no allowance being made for empty space or voids therein constituting the porosity of such material.

The term "actual density" as used herein refers to the weight of a cubic centimeter of porous material, allowance being made for the porosity of such material, i.e., the weight of a cubic centimeter of such material in a solid state without measurable porosity.

The symbol "A." is employed herein to designate angstroms or angstrom units of linear measure, i.e., 1/10000 micron.

The preferred high density carbon electrodes constitute a porous carbon mass having a first exterior surface area which fuel cell electrolyte may contact and a second exterior surface area which fuel may contact with pores, openings or conduits extending from said first exterior surface area to said second exterior area.

The porosity of these electrodes is such that they have an inner surface area in the range of 100 to 300 square meters per gram.

Electrodes of this type may take the form of a hollow cylinder, a curved or flat plate like structure, or they may be prepared in any angular or curved form that is necessary to conform to the overall engineering of the cell. The electrode may be designed so that the catalytically impregnated porous carbon mass constitutes the entire electrode or forms only a part of the electrode where the particular reaction desired or the engineering of the cell requires that other materials be employed in conjunction with the carbon mass, e.g., to lend structural strength.

High density carbon structures suitable for use as a starting material in the production of these electrodes are commercially available. They are characterized as having an apparent density in the range of about 1.2 to 2.1 grams/cc., a tensile strength in the range of 1000 to 3000 p.s.i., a porosity in the range of 10 to 30%, and a maximum pore diameter of below about $4 \times 10^5$ A. Excellent sources of such carbon structures are those marketed under the trade names of Purebon, P–5; Purebon L–50–S and Purebon, P–9. High density structures suitable for use in making these electrodes can be prepared by mixing fine particles of graphite and calcined coke or graphite and lampblack with a suitable binding material such as pitch or cellulosic materials by methods well known in the art. The particles should be of as nearly uniform size as possible. The mixture is molded into the desired electrode shape under elevated pressures in the range of 1 to 30 tons/sq. in. by techniques well known in the art and the formed structures are heated slowly while raising the temperature gradually over a period of several days to a temperature in the range of about 1000° F. to 2500° F. Other methods well known to those skilled in the art are also available for the production of such high density carbon structures. The pore diameters are smaller and more uniform in these high density structures than in the carbons of lower density. The oxidation process to which such structures are subjected in preparing electrodes and which is hereinafter described in detail is controlled so as not to increase the initial porosity by more than 10 to 30% to a total porosity after oxidation in the range of about 10 to about 35%. The pores in the oxidized carbon should have a maximum diameter of about $4 \times 10^5$ A. The smaller pores may range downward to diameters too small to measure. However, at least 30% of such porosity, i.e., total open space per unit volume of carbon mass, should consist of openings in the carbon mass having a diameter falling in the range of between $0.2 \times 10^4$ A. and $2 \times 10^5$ A.

In a preferred embodiment about 30 to 70% of the total pore volume is formed by pores having diameters in the range of $0.2 \times 10^4$ A. to $2 \times 10^5$ A. and 30 to 70% of the total pore volume is formed by pores having diameters in the range of 50 to 400 A.

A suitable method for carrying out the aforesaid oxidation consists of heating a high density mass of porous carbon of the desired shape and construction in an enclosed heating zone at a temperature in the range of 600° to 900° F. for a period in the range of about 1 to about 10 hours in the presence of an oxygen-containing gas, such as air or molecular oxygen. The gas may be introduced either continuously or intermittently, preferably continuously, in such amounts that the total amount of oxygen introduced is in the range of 2 to 80% of the weight of the carbon subjected to oxidation. The oxidation may also be effected by heating the carbon with carbon dioxide at temperatures in the range of 1600 to 2000° F. for a period in the range of about 1 to about 10 hours. Otherwise phrased, the oxidation is continued until the weight of the high density carbon has been decreased in the range of about 1 to 30 wt. percent.

After oxidation the carbon mass is impregnated with cobalt molybdate. In a preferred method the $CoMoO_4$ is formed in situ on the carbon mass. By this method the carbon mass is first soaked in an aqueous solution of a soluble molybdenum compound such as ammonium molybdate, molybdic acid, or sodium molybdate, for a period of time in the range of about 0.1 to 10, preferably 2 to 6, hours. The carbon mass is then heated gradually under an inert gas, e.g., nitrogen, to a temperature above about 1200° F., e.g., in the range of 1200° to 2000° F. or higher for about 0.1 to 10 hours and preferably 2 to 6 hours, to decompose the ammonium molybdate and to distribute the resulting $MoO_3$ over the surface of the cylinder pores. The carbon mass is then soaked in an aqueous solution of a soluble cobalt compound such as cobalt acetate, cobalt nitrate, or cobalt formate, for a period of time in the range of about 0.1 to 10, preferably 2 to 6, hours, and again heated gradually to a temperature above about 1200° F., e.g., in the range of 1200°–2000° F. or higher, under an inert gas for about 0.1 to 10, preferably 2 to 6, hours. This leaves $CoMoO_4$ bonded to the carbon surface. If desired, the solutions of ammonium molybdate and cobalt acetate may be applied successively without an intermediate heat treatment. The treatment is carried out so as to adhere the $CoMoO_4$ to the carbon in an amount such as to constitute about 1 to 30, preferably 5 to 15 wt. percent of the electrode. Cobalt molybdate formed in situ upon the carbon surface in accordance with this method is firmly affixed to the surface and extremely difficult to remove. Electrodes prepared by this method retain their catalytic activity undiminished after extended periods of cell operation.

In certain embodiments it may be useful to employ a grid of reinforcing material upon or within which carbon and cobalt molybdate are situated. In other embodiments it may be advantageous to form a mass of cobalt molybdate, or a mixture of cobalt molybdate and carbon, which in either case is interlaced with filaments or other materials which may be removed as for example by chemical action. Impregnation of such mass with conductive materials may follow such removal where required thus rendering a structure of normally non-conducting cobalt molybdate conductive by associating an electron conductor therewith.

For a better understanding of the present invention, its objects and advantages, reference should be had to the following detailed description and accompanying drawings in which.

Figure 1:
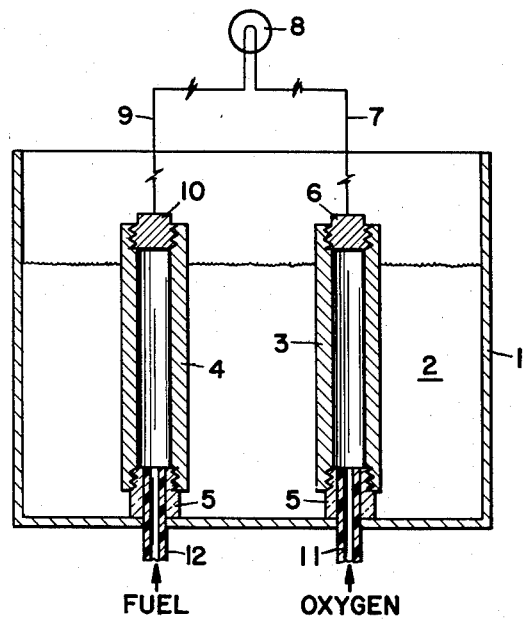
FIGURE 1 is a diagrammatic vertical section of a fuel cell wherein cylindrical diffusion type electrodes are employed in a system using an aqueous electrolyte and a gaseous fuel.

Referring now to FIGURE 1, one embodiment of the invention is carried out in the following manner: Into fuel cell container 1, a vessel constructed of stainless steel, containing an aqueous solution 2, e.g. about 27 wt. percent, of potassium hydroxide, are emersed an "oxygen" electrode 3 and a "fuel" electrode 4. The electrodes are hollow cylinders. The catalyst of the oxygen electrode 3 does not constitute a part of this invention. This electrode may consist of porous carbon impregnated with a catalyst such as a metal chosen from groups VI and VIII of the periodic table, e.g. platinum, palladium, nickel, iron, etc., or simple oxides of these metals such as NiO. Other metals such as silver may also be used as the catalyst and other porous bases which are conductive, e.g., porous nickel may be used in lieu of porous carbon. The fuel electrode 4 is a porous carbon cylinder containing about 1 to 30 wt. percent cobalt molybdate. The aqueous solution of potassium hydroxide 2 serves as an electrolyte and is maintained at a temperature in the range of about 77° to 500° F. Electrodes 3 and 4 are insulated from container 1 by conventional porcelain insulators 5 threaded and shaped to fit into threads in the bottom of the electrodes. The top portion of electrodes 3 and 4 are in electrical contact with connecting means 6 and 10 respectively which in turn are respectively in electrical contact with copper wires 7 and 9. Wires 7 and 9 are also in electrical contact with conventional resistance means 8 representing an external load, e.g., an incandescent lamp, electric motor, etc., for utilizing the power output of the cell and completing the external circuit. Connecting means 6 and 10 are constructed of copper, silver, stainless steel, or similar materials which are good conductors of electrical current and are here in the form of plugs or screws shaped to fit into threads formed into the top parts of electrodes 3 and 4. Portions of electrodes 3 and 4 are shown cut away to reveal the hollow nature of the electrodes and the porous structure of their walls. The cell is operated at 1 to 50 atmospheres pressure.

Oxygen gas is passed through conduit 11 into the interior of electrode 3 from whence it diffuses through the pores or tortuous passageways in the carbon wall to contact the electrolyte which also enters the electrode through the smaller pores thereof. A hydrocarbon gas is passed through conduit 12 into the interior of electrode 4 and diffuses in like manner through the pores of the electrode and contacts the aforesaid electrolyte. An electrochemical reaction is thereby initiated and electrical current is generated by such reaction and passed through the external circuit. Conduits 11 and 12 may be conventional glass, metal or plastic tubing. Fuel and oxygen feeds are maintained at a pressure sufficient only to keep the electrolyte out of the larger pores in the electrodes.

Figure 2:
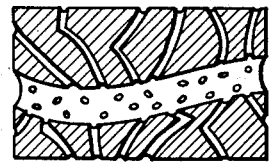
FIGURE 2 is a greatly magnified illustration of a cross sectional view of a porous carbon electrode material illustrating a preferred distribution of pore sizes.

FIGURE 2 is designed to show a larger pore which is filled with gas during operation of the cell and a large number of small pores intersecting the larger pore in which liquid electrolyte overcomes gas pressure thereby creating a multitude of contact points between the oxidant or fuel and electrolyte where such pores intersect the larger gas filled pore.

Figure 3:
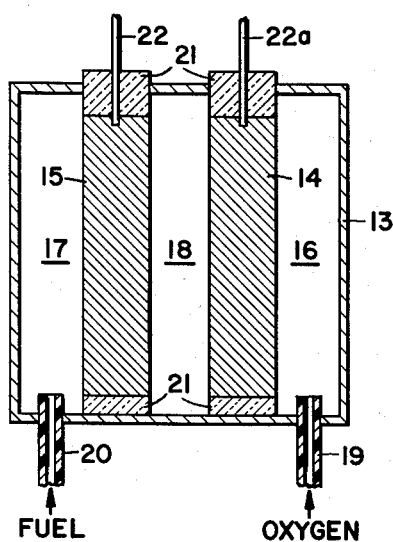
FIGURE 3 is a diagrammatic vertical section of a fuel cell wherein the conducting electrode is a plate-like structure which may be either flat, angular or curved in accordance with desired embodiments of this basic design.

In FIGURE 3, a cell employing plate-like electrodes, the space inside cell container 13 is divided by a porous cathode, i.e., oxygen electrode 14, and a porous carbon, cobalt molybdate impregnated anode, i.e., fuel electrode 15, into an oxygen receiving zone 16, a fuel receiving zone 17 and electrolyte compartment 18. Oxygen is introduced into oxygen receiving zone 16 via conduit 19. Fuel gas is introduced into fuel receiving zone 17 via conduit 20. Electrodes 14 and 15 are insulated from cell container 13 by conventional insulators 21. Connecting means 22 and 22A form the beginnings of an external circuit.

Figure 4:
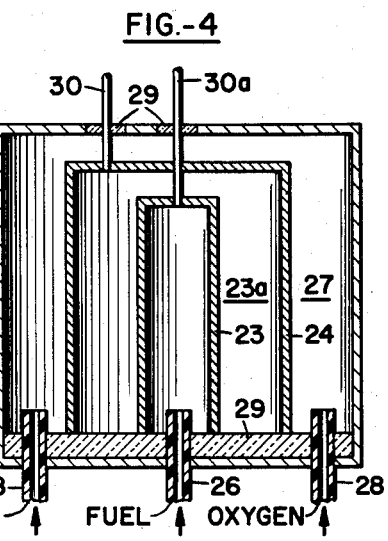
FIGURE 4 is a diagrammatic vertical section of a fuel cell wherein the fuel electrode is a hollow cylinder situated within the central cavity of a larger cylinder serving as the oxygen electrode.

In a cell of the type shown in FIGURE 4, a porous carbon-cobalt molybdate containing hollow cylinder 23 is situated inside a larger porous cylinder 24 which serves as the "oxygen electrode." Oxygen electrode 24 is in turn surrounded by cell container 25. A fuel gas is introduced into the interior of electrode 23 via conduit 26. Oxygen is introduced into an oxygen receiving zone 27 between electrode 24 and cell container 25 via conduit 28. An aqueous electrolyte 23A separates electrodes 23 and 24. Electrodes 23 and 24 are insulated from cell container 25 by conventional insulating means 29. Connecting means 30 and 30A form the beginnings of an external circuit for withdrawing electrical power from the cell.

Aside from the differences in construction operation of the cells shown in FIGURES 3 and 4 is essentially the same as that described with reference to the cell shown in FIGURE 1.

Figure 5:
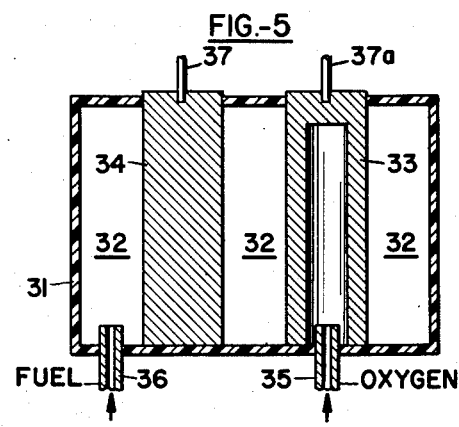
FIGURE 5 is a diagrammatic vertical section of a fuel cell for use in a system wherein a liquid fuel is admitted to the electrolyte before contacting the fuel electrode.

FIGURE 5, represents a somewhat different type of cell which is suitable for use with a liquid fuel, e.g. liquid hydrocarbons or oxygenated hydrocarbons such as alcohols, ketones, aldehydes and carboxylic acids. In FIGURE 5, the cell container 31 encloses an aqueous electrolyte 32 in which are immersed a cathode 33 in the form of a hollow cylinder, and a porous carbon and cobalt molybdate anode 34. Oxygen is admitted to the interior of electrode 33 via conduit 35. A liquid fuel, e.g., methanol, is introduced into electrolyte 32 via conduit 36. Connecting means 37 and 37A represent the beginnings of an external circuit for removing an electrical current from the cell. Since a distribution of both gas and liquid within the "fuel electrode," i.e., the anode, is not required here, the existence of dual porosity is not of the importance in a cell of the type shown in FIGURE 5 that it is in the cells employing a gaseous fuel. However, it is still desirable. Maximum area of contact between fuel electrode and the liquid fuel is here the major consideration, but effective distribution throughout the electrode is enhanced by the existence of an appreciable number of larger feeder pores.

The following examples are presented for purposes of illustration only and the details therein should not be construed as limitations upon the true scope of the invention as set forth in the claims.

EXAMPLE I

Carbon cylinders and plates having an apparent density in the range of 1.2 to 2.1 grams/cubic centimeter, a porosity of about 15%, and a tensile strength of about 1200–1500 p.s.i. are prepared by thoroughly mixing 40 to 60 parts of graphite and 40 to 60 parts of calcined coke particles that will pass through a standard 200 mesh screen with a coal tar pitch binder, drying the resulting mixture, grinding the dried mixture to a fine powder, molding the powdered mixture into conventional shapes under a pressure of about 7–10 tons per square inch, and sintering the compressed carbon mass by gradually increasing the temperature over a period of about 7 days to about 1800° F. These carbon structures are then machined to the size and shape desired.

A number of porous carbon cylinders and flat plates prepared in accordance with this method and having an apparent density of about 1.7 grams/cubic centimeter are weighed at room temperature, heated in an oven at an average temperature of about 1832° F. for 6 hours with $CO_2$ being introduced into the oven at a rate of 100 cubic centimeters/minute. The cylinders and plates are found to have decreased about 7.5% during the treatment. The maximum pore diameter of the carbon mass is found to be below $4 \times 10^5$ A.

The cylinders and plates are found to have a pore size distribution wherein about 40% of the pore volume results from pores having a diameter of between 50 and 400 A. and 54% of the pore volume results from pores having diameters in the range of $0.2 \times 10^4$ A. to $2 \times 10^5$ A.

A high density carbon mass prepared in accordance with the aforerecited method is soaked in an aqueous solution of ammonium molybdate for about 6 hours. The carbon mass is dried and then heated under nitrogen gas to decompose the ammonium molybdate to $MoO_3$ and then heated further to a temperature of about 1225° F. to redistribute the $MoO_3$ over the surface of the carbon. The carbon mass is then soaked in an aqueous solution of cobalt acetate for about 6 hours and again heated to a temperature of about 1225° F. under nitrogen. This treatment leaves $CoMoO_4$ bonded to the carbon mass. The impregnated mass constitutes an electrode which is ready for installation in a fuel cell.

A number of other carbon cylinders and plates prepared in the same manner are impregnated with other catalysts.

The comparative performance of cobalt molybdate with other catalysts at a fuel electrode is tested in a fuel cell employing an aqueous KOH electrolyte and operated at 300° F. and 300 p.s.i.g. Ethane is employed as the fuel. The catalyst being tested is in each case supported upon a porous carbon base. The composition and the method of preparation for the base is the same for each test. The cathode, i.e., oxygen electrode, employed for all tests is palladium on carbon. Each catalyst is tested in 45 minute runs during which a current is drawn from the cell.

The catalysts tested and the results obtained are set forth in the following table:

*Table I*

| Fuel Electrode Catalyst | Operating Results (Watts/sq. ft. based upon fuel electrode surface) external |
|---|---|
| Ni | When 1.3 watts per sq. ft. are drawn from the cell the voltage decreases from an open circuit voltage voltage of 0.62 to 0.16 volt. Of the total 0.46 voltage drop, the drop occuring at the fuel electrode (polarization at fuel electrode) is 0.24. |
| $NiMoO_4$ | When 0.6 watt per sq. ft. are drawn from the cell the voltage decreases from an 0.9 open circuit voltage to 0.21 volt. Of the total 0.69 voltage drop occurring. 0.59 occurs at the fuel electrode. |
| $FeO_3$ | This catalyst did not provide a measurable current with ethane. |
| $ZnMoO_4$ | When .05 watt per sq. ft. are drawn from the cell the voltage decreases from an open circuit voltage of 0.87 to 0.02 volt. Of the total 0.85 voltage drop occurring, 0.75 occurs at the fuel electrode. |
| Pt | When 0.7 watt per sq. ft. are drawn from the cell the voltage decreases from an open circuit voltage of 0.40 to 0.20 volt. Of the total 0.20 voltage drop occurring, 0.12 occurs at the fuel electrode. |
| $CoMoO_4$ | When 67.2 watts per sq. ft. are drawn from the cell the voltage decreases from an open circuit voltage of 0.67 to 0.6 volt. Of the total 0.07 voltage drop occurring, 0.05 occurs at the fuel electrode. |

Thus, it is seen that the polarization at the fuel electrode is less with a cobalt molybdate catalyst when drawing 67.2 watts (112 amperes per sq. ft. of electrode at 0.6 volt) than with the other catalysts when 0.05 to 1.3 watts are drawn from the cell.

EXAMPLE II

To check the stability of the cobalt molybdate catalyst as compared to one of the better metal catalysts of the prior art a cell was operated and a quantitative analysis of the reaction made by measuring the ethane and oxygen input to the cell, measuring the electric current withdrawn from the cell and analyzing the products formed in the electrolyte. Ethane was employed as the fuel. Molecular oxygen was employed as the oxidant. The cell was operated at 400° F. and 400 p.s.i.g. The oxygen electrode employed was nickel oxide partially coated with platinum.

The oxygen consumed in the cell was used as shown in the following table i.e. by percentage of the total consumed.

*Table II*

| Fuel Electrode Catalyst | Electrochemically to Oxidize Ethane | Electrochemically to Oxidize the Electrode | Other (includes $O_2$ adsorbed on cell surfaces when reaction stopped) |
|---|---|---|---|
| $CoMoO_4$ | 93 | 0 | 7 |
| Ni | 28 | 63 | 9 |

Failure to oxidize the electrode itself will allow the fuel cell to operate for long periods of time with no decrease in the activity of the fuel electrode.

EXAMPLE III

A fuel cell is operated with cobalt molybdate (6.2 wt. percent) on porous carbon constituting the fuel electrode. An aqueous electrolyte, 30 wt. percent $H_2SO_4$, is employed. A porous carbon electrode employing 0.5 wt. percent platinum is employed as the oxygen electrode. Ethane is oxidized at a temperature of 177° F. at atmospheric pressure. Current is drawn from the cell. At a current density of 15 amperes/ft.$^2$ the polarization occurring at the "fuel electrode" is less than with other catalysts hereinbefore mentioned when lesser currents are drawn.

EXAMPLE IV

A fuel cell with cobalt molybdate as the anode catalyst is operated as in Example I except that propane is employed as the fuel and the cell is operated at a temperature of 400° F. and 400 p.s.i.g. Current is drawn from the cell with insignificant polarization at the anode (fuel electrode). The fuel electrode here contains about 20 wt. percent cobalt molybdate.

EXAMPLE V

A fuel cell is operated with cobalt molybdate on porous carbon constituting the fuel electrode and NiO—CoO on porous carbon constituting the oxygen electrode. Potassium hydroxide is employed as the electrolyte. Ethyl alcohol is employed as the fuel and is added directly to the electrolyte. The cell is operated at atmospheric pressure and at a temperature of 180° F. Current is drawn from the cell with highly satisfactory maintenance of voltage. The run is repeated using a mixture of NiO and LiO as a cathode catalyst.

EXAMPLE VI

A cell is operated as in Example V except that acetone is employed as the fuel and a 10 wt. percent $H_2SO_4$ aqueous electrolyte is employed. Current is drawn from the cell.

EXAMPLE VII

A cell is operated as in Example V except that formaldehyde is employed as the fuel. Air is used as the oxidizing gas.

EXAMPLE VIII

A fuel cell is operated as in Example I except that the catalysts compared in Example I are employed on conventional carbon electrodes, i.e. carbon having some pores ranging up to $1 \times 10^6$ A. and larger. None of the electrodes under test perform as well as the electrodes in Example I having the same catalyst. However, the polarization occurring at the fuel electrode is again far lower with the $CoMoO_4$ catalyst than with the other catalysts.

Other tests are conducted with carbon having a pore distribution wherein a major portion of the pore volume therein results from pores having an average pore diameter in the range of 10 to 100 A. Flooding of the electrode with electrolyte reduces the efficiency of the cell.

EXAMPLE IX

The procedure of Example I is repeated except that hydrogen gas is employed as the fuel and a current is drawn from the cell. Although cobalt molybdate is an operable catalyst with hydrogen fuel the electrochemical reaction at such electrode is surprisingly promoted to a greater degree when a carbonaceous fuel, i.e., a hydrocarbon or an oxygenated hydrocarbon, is employed. This is contrary to past experience in the art which has usually found it far more difficult to use carbonaceous fuels effectively indicating that cobalt molybdate affects electrochemical reaction in a different manner than catalysts heretofore employed.

EXAMPLE X

The procedure of Example I is repeated employing ethylene as the fuel. The cell is operated at about 175° F. Current is drawn from the cell.

EXAMPLE XI

Additional tests are conducted in accordance with Example I using in turn the following fuels, methane, ethane, ethylene, propane, propylene, butane, pentane, hexane and a mixture of $C_1$–$C_8$ aliphatic hydrocarbons. The rate of reaction differs somewhat in each test but in each cobalt molybdate is superior to other catalysts tested. Current is drawn from the cell in each test.

EXAMPLE XII

Additional tests are conducted in accordance with Example V using in turn the following fuels, methanol, formaldehyde, ethanol, acetone, acetaldehyde, acetic acid, isopropanol, secondary butanol and a mixture of $C_1$–$C_{10}$ aliphatic alcohols. The rate of reaction differs somewhat in each test but in each cobalt molybdate is superior to other catalysts tested. Current is drawn from the cell in each test.

What is claimed is:

1. A fuel cell comprising an electrolyte container with an aqueous electrolyte therein, a cathode and a fuel electrode comprising a foraminous structure of an electron conductor and cobalt molybdate, said cathode and fuel electrode spaced apart and emersed in said electrolyte, a first inlet means for passing an oxidizing gas in contact with said cathode, a second inlet means for passing a fluid combustible fuel in contact with said cobalt molybdate, and an external electrical conductor connecting said fuel electrode and said cathode whereby electrical energy generated in said cell can be conducted therefrom.

2. A fuel cell in accordance with claim 1 wherein said fuel is a liquid.

3. A fuel cell in accordance with claim 1 wherein said fuel is a gas.

4. A fuel cell in accordance with claim 1 wherein said fuel electrode comprises porous carbon impregnated with 5 to 15 wt. percent cobalt molybdate.

5. A fuel cell in accordance with claim 1 wherein said cathode contains a noble metal.

6. A fuel cell in accordance with claim 1 wherein said cathode contains a transition metal oxide selected from the group consisting of NiO, MnO and CoO.

7. A fuel cell comprising a vessel, an aqueous electrolyte in said vessel, a porous oxygen electrode and a fuel electrode comprising porous carbon impregnated with cobalt molybdate, said oxygen electrode and said fuel electrode spaced apart and emersed in said electrolyte, a first inlet means for passing an oxidizing gas in contact with said oxygen electrode, a second inlet means for passing a fluid combustible fuel in contact with said cobalt molybdate, and an external circuit connecting said fuel electrode and said oxygen electrode whereby electrical energy generated in said cell can be conducted therefrom.

8. A cell in accordance with claim 7 wherein said porous carbon has a maximum pore diameter of about $4 \times 10^5$ A.

9. A cell in accordance with claim 7 wherein said porous carbon has an internal area of 100 to 300 square meters per gram and wherein 30 to 70% of the total pore volume results from pores having diameters in the range of $0.2 \times 10^4$ A. to $2 \times 10^5$ A. and 30 to 70% of the total pore volume results from pores having diameters in the range of 50 to 400 A.

10. A cell in accordance with claim 7 wherein said electrolyte comprises an acid.

11. A cell in accordance with claim 7 wherein said electrolyte comprises a base.

12. A fuel cell comprising an electrolyte container with an aqueous electrolyte therein, a porous oxygen electrode and a fuel electrode comprising a porous carbon structure impregnated with cobalt molybdate formed in situ, said oxygen electrode and fuel electrode being spaced apart from each other and from said container and emersed in said electrolyte, an oxidizing gas in contact with said oxygen electrode and said electrolyte, a fluid combustible fuel in contact with said fuel electrode and said electrolyte, a first inlet means for passing said oxidizing gas in contact with said oxygen electrode, a second inlet means for passing said fuel in contact with said fuel electrode.

13. A cell in accordance with claim 12 wherein said aqueous electrolyte comprises potassium hydroxide.

14. A cell in accordance with claim 12 wherein said aqueous electrolyte comprises sulfuric acid.

15. An apparatus for use in generating electricity which comprises a cell container enclosing a reaction zone, an oxygen electrode and a fuel electrode comprising porous carbon impregnated with cobalt molybdate, said oxygen electrode and said fuel electrode being spaced apart and extending into said reaction zone, means for passing an oxidizing gas in contact with said oxygen electrode, means for passing a fluid combustible fuel in contact with said fuel electrode.

16. An apparatus for use in generating electricity which comprises an electrolyte container, an aqueous electrolyte in said container, a porous cathode and a fuel electrode comprising a foraminous structure of porous carbon and cobalt molybdate, said cathode and said fuel electrode spaced apart and emersed in said electrolyte, means for passing an oxidizing gas in contact with said cathode, means for passing a fluid combustible fuel in contact with said fuel electrode, and conducting means connecting said cathode with said fuel electrode.

17. A method for generating electricity, which comprises bringing a fluid combustible fuel selected from the group consisting of hydrogen, hydrocarbons, oxygenated hydrocarbons and carbon monoxides into simultaneous contact with an aqueous electrolyte and a surface of a catalytic and electron conductive mass comprising cobalt molybdate, at the same time bringing an oxygen containing gas selected from the group consisting of air and molecular oxygen into simultaneous contact with said electrolyte and a surface of a catalytic cathode, and connecting said mass and said cathode by means of an external electrical circuit which receives the generated electricity.

18. A method in accordance with claim 17 wherein the temperature of operation is in the range of 77° to 600° F.

19. A method in accordance with claim 17 wherein the temperature of operation is in the range of 150° to 350° F.

20. A method in accordance with claim 17 wherein the pressure of operation is in the range of 1 to 50 atmospheres.

21. A method in accordance with claim 17 wherein the pressure of operation is about 1 atmosphere.

22. A method for generating electricity, which comprises bringing a fluid combustible fuel selected from the group consisting of hydrogen, hydrocarbons, oxygenated hydrocarbons and carbon monoxides into simultaneous contact with an aqueous electrolyte and a surface of a catalytic and electron conductive mass comprising a foraminous structure of porous carbon and cobalt molybdate, at the same time bringing an oxygen containing gas selected from the group consisting of air and molecular oxygen into simultaneous contact with said electrolyte and a surface of a catalytic cathode, and connecting said mass and said cathode by means of an external electrical circuit which receives the generated electricity.

23. A method in accordance with claim 22 wherein said fuel is an aliphatic alcohol.

24. A method in accordance with claim 22 wherein said fuel is ethane.

25. A method in accordance with claim 22 wherein said fuel is propane.

26. A method in accordance with claim 22 wherein said fuel is an aliphatic alcohol.

References Cited in the file of this patent

UNITED STATES PATENTS

| | | |
|---|---|---|
| 1,272,952 | Holmes | July 16, 1918 |
| 2,067,738 | Suzuki | Jan. 12, 1937 |
| 2,636,856 | Suggs et al. | Apr. 28, 1953 |
| 2,837,590 | Rhyne | June 3, 1958 |
| 2,841,632 | Machall et al. | July 1, 1958 |
| 2,873,257 | Hunter | Feb. 10, 1959 |
| 2,935,547 | Kordesch | May 3, 1960 |
| 2,938,064 | Kordesch | May 24, 1960 |